United States Patent [19]

Kress et al.

[11] Patent Number: 4,975,002
[45] Date of Patent: Dec. 4, 1990

[54] BORING TOOL FOR COARSE AND FINE MACHINING

[75] Inventors: Dieter Kress, Aalen; Friedrich Häberle, Lauchheim, both of Fed. Rep. of Germany

[73] Assignee: MAPAL Fabrik für Präzisionswerkzeuge Dr. Kress KG, Aalen, Fed. Rep. of Germany

[21] Appl. No.: 336,436

[22] Filed: Apr. 10, 1989

Related U.S. Application Data

[63] Continuation-in-part of Ser. No. 93,369, Sep. 4, 1987.

[30] Foreign Application Priority Data

Sep. 6, 1986 [DE] Fed. Rep. of Germany ....... 3630402
Sep. 4, 1987 [EP] European Pat. Off. ............ 87112978.92302

[51] Int. Cl.$^5$ .............................................. B23B 51/00
[52] U.S. Cl. .................................. 408/224; 408/187; 408/189; 408/231
[58] Field of Search ............... 408/223, 224, 225, 199, 408/200, 231, 233, 713, 189, 190, 191, 196, 197, 187, 188, 180, 186; 407/45, 46, 47, 44, 114

[56] References Cited

U.S. PATENT DOCUMENTS

| | | | |
|---|---|---|---|
| 2,204,855 | 6/1940 | Healy | 408/116 |
| 2,630,725 | 3/1953 | Black | 408/224 |
| 3,213,716 | 10/1965 | Getts | 408/713 |
| 3,548,687 | 12/1970 | Holloway | 77/69 |
| 3,922,766 | 12/1975 | Malinchak | 29/105 |
| 4,230,429 | 10/1980 | Eckle | 408/186 |
| 4,606,678 | 8/1986 | Zweekly | 407/114 |
| 4,611,959 | 9/1986 | Kress et al. | 408/153 |
| 4,626,140 | 12/1986 | Zweekly et al. | 407/114 |
| 4,705,434 | 11/1987 | Patterson et al. | 407/114 |

FOREIGN PATENT DOCUMENTS

| | | |
|---|---|---|
| 2556977 | 6/1977 | Fed. Rep. of Germany . |
| 2935389 | 3/1980 | Fed. Rep. of Germany . |
| 2902750 | 8/1980 | Fed. Rep. of Germany . |
| 219695 | 3/1985 | German Democratic Rep. . |
| 249671 | 5/1948 | Switzerland . |
| 1556661 | 11/1979 | United Kingdom . |

OTHER PUBLICATIONS

Journal Wekstadt und Betrieb by K. Faber (1977) pp. 615-618.

Primary Examiner—Daniel W. Howell
Attorney, Agent, or Firm—Toren, McGeady & Associates

[57] ABSTRACT

There is disclosed a boring tool which exhibits a cutting head with several cutting plates arranged on the periphery of the cutting head. Each of the cutting plates are pressable with a fastening device against a shoulder of the cutting head. The distances of the cutting plates from the longitudinal axis of the cutting head are slightly different. The cutting heads are staggered with respect to one another in the direction of the longitudinal axis. The cutting plates (1, 2, 3) are formed in a circular shape and are arranged so that the force exerted during operation of the cutting head by the cutting plates compensate each other. The effective cutting edge sections, projecting in an axial plane, continually blend into one another. The boring tool is particularly suitable as a fine boring tool for the production of precision bores.

23 Claims, 3 Drawing Sheets

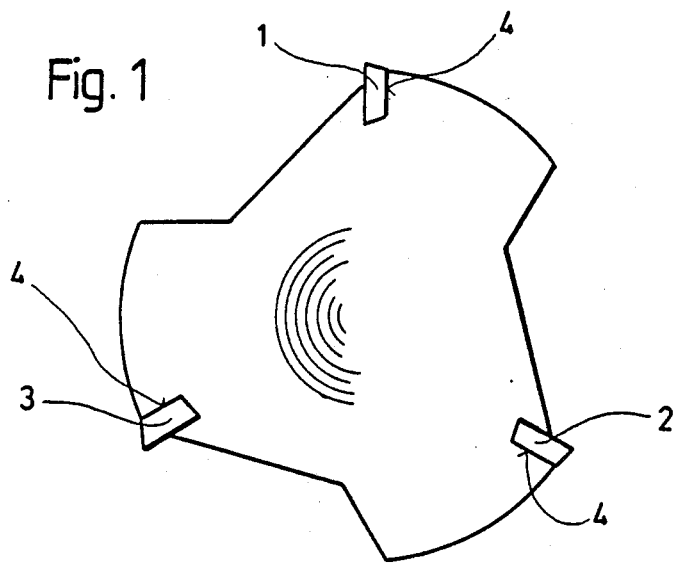
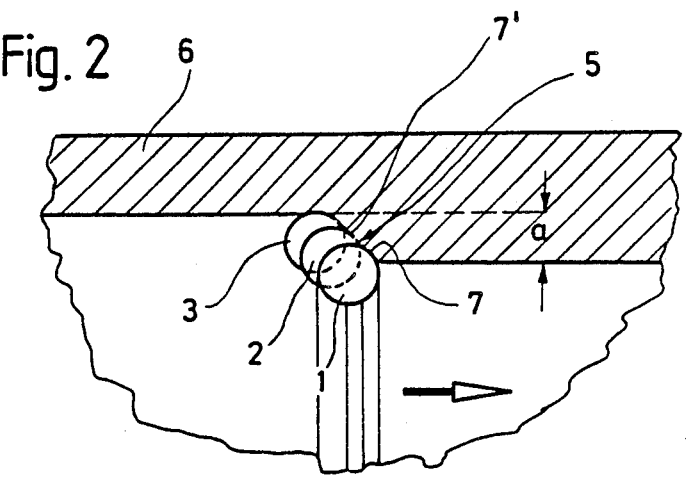

BORING TOOL FOR COARSE AND FINE MACHINING

CROSS-REFERENCE TO RELATED APPLICATIONS

This application is a continuation-in-part application of another application filed Sept. 4, 1987 and bearing Ser. No. 07/093,369. The entire disclosure of this latter application, including the drawings thereof, is hereby incorporated in this application as if fully set forth herein.

BACKGROUND OF THE INVENTION

1. Field of the Invention

The present invention relates to a boring tool for coarse and fine machining.

2. Brief Description of the Background of the Invention Including Prior Art

Boring tools serve for boring bores in a workpiece to a desired end measurement or dimension. At the same time, a bore surface of high quality should be achieved. Such a boring tool is for example known from the U.S. Pat. No. 2,630,725. Said boring tool exhibits a cutting head having a longitudinal axis and a peripheral surface, where several cutting plates are pressed with a fastening device against one shoulder of the knife head. The distance of the cutting plates in relation to the longitudinal axis of the cutting head is different. Moreover, the cutting plates are staggered with respect to one another in the direction of the longitudinal axis. A disadvantage of this boring tool is that the surface of the bore to be enlarged in the bore area does not exhibit the desired quality because the boring tool is not guided centrically inside the bore.

A boring tool or reamer of such a kind is further known, for example, from German Patent Application Laid Open 2,556,977. It shows a cutting head with several cutting plates on its periphery which, in each case, can be pressed with a fastening device against a shoulder of the cutting head, whose distances from the longitudinal axis of the cutting head are different, and which are staggered with respect to one another in the direction of the longitudinal axis. A disadvantage of this boring tool is that a jig bushing is required for guiding the tool while drilling, in order to obtain a bore area with a useful surface of the bore, and that guide gibs must be employed, in order to guide the tool inside the bore in the center.

SUMMARY OF THE INVENTION

1. Purposes of the Invention

It is an object of the invention to provide a bore tool of simple construction.

It is another object of the invention to provide a bore tool with which bores can be bored in such a way that a smooth inner surface having a high surface quality can be achieved in the bore region.

These and other objects and advantages of the present invention will become evident from the description which follows.

2. Brief Description of the Invention

The present invention provides for a boring tool. It is particularly advantageous to dispose the cutting plates in such a way that a soft cut results, where the forces acting during operation of the tool on the cutting plates are of substantially equal magnitude such that an automatic centering of the tool is achieved. In this manner, tools can be constructed for which no guide gibs need be provided for. Moreover, it is not necessary to provide a bore bushing for the centering of the tool upon boring. The cutting plates are disposed in such a way that the sections of the cutting edges, projecting in a plane intersecting the longitudinal axis of the cutting head, continually blend into one another. The cutting plate, which enters first into contact with the surface of the bore, cuts out a channel serving as a furrow, which serves in guiding and stabilizing the tool inside the bore.

A boring tool for simultaneous coarse and fine precision drilling of bores comprises a cutting head having a longitudinal rotation axis and a peripheral surface and having a plurality of shoulders. A fastening device is coordinated to each shoulder. A plurality of cutting plates is included with substantially the entire outer edge of each individual cutting plate capable of serving as cutting edge by repositioning during respective servicing operations. The cutting plates are arranged on the periphery of the cutting head. Each fastening device presses the respective cutting plate against a respective one of the shoulders of the cutting head. The distances of the individual cutting plates from the longitudinal rotation axis of the cutting head are of different size. The cutting plates are disposed staggered with respect to one another in the direction of the longitudinal rotation axis. The cutting plates are disposed such that frontmost cutting plates, viewed in feed direction, engage with a region of their cutting edge with the bore wall. Said region, viewed in feed direction, is located ahead of the location of a cutting edge section of a respective frontmost cutting plate having the largest distance from the longitudinal axis of the tool. The cutting edge regions of respective cutting plates, and engaging with the bore wall, are selected such that they continually blend into one another and form substantially a circularly arched envelope upon a projection in a plane passing through the longitudinal axis of the cutting head, wherein each of the cutting plate projections and the circular envelope have a common point, at which common point the tangent of the respective cutting plate and of the circular envelope coincide. The radius of said envelope can be approximated with a curvature having a radius of curvature of from about three to ten times the size of the diameter of the cutting plates.

The cutting plates can be mounted on the cutting head to allow a rotation of the cutting plate during tool service operations. The individual cutting edges of the cutting plates can be formed by sections of a circular arc and have associated chip-guiding steps curved into the shape of a circular arc. The cutting plate with the largest spacing relative to the longitudinal axis of the tool can be adjustable in radial direction. The spacing of all three cutting plates can be adjustable with respect to the longitudinal axis of the tool. In general, the cutting plates are placed such that the spacing measured in axial direction from circular cutting plate to circular cutting plate is equal to or less than half the diameter (D) of the circular cutting plate and preferably equal to or less than half the radius (r) of the circular cutting plate.

The fastening device can include a bracing claw formed of a circular sector with a diameter of from about 2 to 3 times the diameter of the cutting plate. The bracing claws can have a recess in the area of a chord area of the circular sector within one side half of the chord. The fastening device can include a bolt associated with a clamping disk. The clamping disk can have a diameter of from 1 to 1.5 times the diameter of the cutting plate. The clamping plate can engage the circular sector in the area of one half of its rounded edge, which half can be disposed remote relative to the side of the chord provided with the recess for the cutting plate. A chord of the circular sector can be directed substantially in parallel to the longitudinal rotation axis of the cutting head. The fastening device can include a bolt associated with a clamping disk for retaining the bracing claw. The bolt can be threaded in a direction running about parallel to the rotation axis of the cutting plate.

An exemplified embodiment is preferred where the cutting plates are formed rotatable. In this way, the wear of a cutting edge area of the cutting plate can be easily equalized.

Preferably, three cutting plates, disposed equally spaced from one another on the periphery of the cutting head, are employed. In this way, together with an easy construction of the tool, an optimum equalization of the forces arising in operation is possible.

An exemplified embodiment is particularly preferred where circularly arcuate chip steps are associated with the cutting edges of the cutting plates, curved into the shape of a circular arc, where the curvature of the chip steps is directed substantially opposite to the curvature of the cutting edge. The spacing of the effective cutting edge section, engaging the tool, from the chip-guiding and chip-breaking chip steps varies and thus can be changed by rotation of the cutting plate. The tool can thus be easily adapted to different materials since, in each case, an optimum spacing of the cutting edge relative to the chip step can be adjusted. In this manner, the length of the chip can be selected such that the tool is not hindered and a high quality and precision of the bore surface can be achieved.

An exemplified embodiment is particularly preferred where at least the cutting plate, having the largest spacing relative to the longitudinal axis of the tool, can be adjusted in radial direction. This means, the spacing of the cutting plate relative to the longitudinal axis of the tool is variable. Therefore, the radius of the drilled bore can be adjusted to the desired measurement.

It is particularly advantageous that the cutting plates or cutters are so formed and arranged that a soft cut results, wherein the forces, acting during the operation on the cutting plates, are of equal magnitude, so that an automatic centering of the tool is achieved. In this manner, tools can be offered for which no guide gibs need be provided for. The cutting plates are so arranged that the sections of the cutting edges, projecting in a plane intersecting the longitudinal axis of the cutting head, continually blend into one another, so that, as can be seen in FIG. 2, an intersection of the circularly-shaped cutters with an imaginary axial plane during rotation of the tool defines three circles outwardly bounded by a nearly uniformly curved envelope. In this way, an optimum surface quality of the bore cylinder is obtained. A channel serving as a furrow, which results in guiding and stabilizing the tool inside the bore, is cut out by the round cutting plate which enters first into contact with the surface of the bore.

Particularly preferred is an embodiment in which circularly arcuate chip steps are associated with the cutting edges curved into the shape of a circular arc, wherein the curvature of the chip steps is opposite of that of the curvature of the cutting edges. The spacing of the effective cutting edge section, engaging the workpiece from the chip-guiding and chip-breaking steps, also can be changed by rotation of the cutting plate. The tool thus can be easily adapted to different materials since, in each case, the optimum distance of the cutting edge from the chip step can be adjusted. In this manner, the length of the chip can be selected so that the tool is not hindered and a high degree of fineness of the bore surface can be achieved.

In a further preferred exemplified embodiment, all cutting plates are radially adjustable. Thereby, the chip-generating load of the outermost cutting plate, occurring upon machining of bores, can be reduced. Moreover, the forces acting on the tool can be better balanced or equalized.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 1 is a front view of the boring tool cutting head,

FIG. 2 is a section of a longitudinal section through a bore with cutting plates projecting in the plane of the drawing to show the successive engagement of cutting plates and bore.

DESCRIPTION OF INVENTION AND PREFERRED EMBODIMENT

Figure 3:
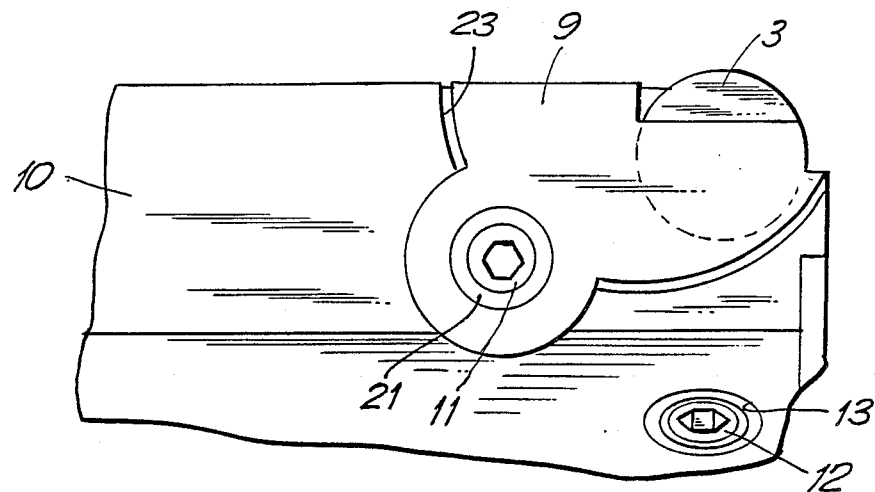
FIG. 3 is a side view of a boring tool, illustrating the mounting support of circular cutting plates.

A boring tool is illustrated in FIGS. 1 to 4. The boring tool includes a cutting head to be rotated around a center axis of the boring tool.

Three cutting plates 1, 2, 3 are arranged on the periphery of the cutting head and are installed at a distance of 120 degrees from each other, which are pressed against a shoulder of the cutting head by means of at least one bracing claw 9. The three circular cutting plates 1, 2, and 3, are disposed at defined distances from the center axis and are, in each case, staggered by 120 degrees relative to one another, on the periphery of the cutting head. The circular cutting plates exhibit a spacing of unequal magnitude from the rotational or longitudinal axis, as the case may be, of the cutting head and are slightly staggered axially, i.e., in the direction of the longitudinal axis with respect to one another so that, in projecting the three effective cutting edge sections engaging the workpiece, a nearly uniformly curved envelope results, wherein each of the cutting plate projections and the circular envelope have a common point, at which common point the tangent of the respective cutting plate and of the circular envelope coincide. Both forward cutting plates 1 and 2 serve as rough cutters, while the third cutting plate 3 serves the fine working of the workpiece. With the three cutting plates, an area designated in FIG. 2 by "a" is removed.

The cutting edges of the cutting plates form the parts of the cutting head radially most extended relative to the center axis of the cutting plate. The cutting plates 1, 2, and 3 are pressed by at least one bracing claw 9 against one shoulder 4 of the cutting head.

FIG. 2 shows a longitudinal section through a bore. The three cutting plates 1, 2, and 3 are formed circular-shaped and are all staggered as seen in their rotary projection into the image plane in the sectional representation in FIG. 2. The boring tool is moved from the left to the right in the pre-bore of FIG. 2, which is indicated by a double arrow in the selected representation.

The region altogether cut from the bore wall 6 by the three cutting plates is designated with "a" in FIG. 2.

The three cutting plates exhibit an unevenly large spacing from the rotation axis or, respectively, the longitudinal axis of the cutting head. Said cutting plates are slightly staggered in axial direction with respect to one another, that is in the direction of the longitudinal axis of the tool, such that there results, at the projection of the three effective cutting edge sections of the circular cutting plates engaging the tool, a nearly uniformly curved envelope of the three cutting edges, wherein each of the cutting plate projections and the circular envelope have a common point, at which common point the tangent of the respective cutting plate and of the circular envelope coincide. In FIG. 2, the cutting edge section of the cutting plate 1 is designated with the reference C, the cutting edge section of the cutting plate 2 is designated with the reference B, and the cutting edge section of the cutting plate 3 is designated with the reference A. The radius A of the envelope U, generated during drilling in the pre-blank, is about three to ten times larger than the diameter of the individual cutting plates.

The two front cutting plates 1 and 2, viewed in feed direction or, respectively, in radial direction, are staggered so slightly with respect to one another that they come in contact with one region of their outer or, respectively, cutting edge with the bore wall 6. Viewed in the feed direction, the front contact region of the cutting plate 2, 3 is before that location point of the peripheral line of the circular cutting plate 1 or 2 which exhibits the largest spacing from the longitudinal axis of the tool. Thus, the average cut of the cutting plates 1 and 2 occurs at an angle of from about 30 to 60 degrees relative to the bore cylinder surface, thereby transforming the radial expansion substantially into a forward drilling operation. In this manner, there results a particularly soft cut upon introduction of the tool into the bore to be machined. Merely one of the regions of the cutting edge of the hindmost cutting plate, viewed in feed direction, enters in contact with the bore wall, that is the region exhibiting the largest radial distance spacing with respect to the longitudinal axis of the tool. Therefore, while the circular cutting plates 1 and 2 are employed essentially for the enlargement of the diameter, i.e. the roughing treatment, of the bores to be bored, the hindmost cutting plate 3 serves for the precision fine treatment of the bore wall.

As seen in drill advance direction, the two front cutting plates 1 and 2 serve substantially to expand the diameter of the desired bore. The front cutting plate is employed for the coarse machining of the bore wall, and the cutting plate 2 as a center cutter for the middle removal of the annular wall section. The rearmost cutting plate 3 serves as a finishing cutter for fine machining of the bore wall.

The cutting plate can protrude from the recess of the clamping jaw by a depth corresponding to 0.2 to 0.4 of the diameter of the cutting plate and preferably by a depth corresponding to 0.25 to 0.35 of the diameter of the cutting plate.

The fastening device can include a set screw for positioning the fastening device relative to the cutting head. The advance direction of the set screw can be disposed in a plane perpendicular to the longitudinal rotation axis of the cutting head.

In order to precisely maintain the desired diameter of the bore, the hindmost cutting plate can in particular be adjusted radially. This means, the distance of the hindmost cutting plate is variable with respect to the longitudinal axis of the tool.

The spacing of the two front cutting plates 1 and 2, with respect to the longitudinal axis of the tool, can also be variable by means of a suitable adjustment device. Such an adjustment device is exemplified in FIG. 3.

The region forming an annulus removed from the bore wall 6 by the three cutting plates is designated with "a" in FIG. 2. The cutting plates 1, 2, and 3 are disposed preferably such that the front cutting plate 1 removes from about 40 to 60 percent, perhaps 50 percent, of the region "a" to be removed from the bore wall. The second cutting plate 2 then removes from about 20 to 40 percent, that is perhaps 30 percent, and the rearmost cutting plate 3 removes about 5 to 30 percent, or perhaps 10 to 20 percent of the total removed amount. It is essential that the cutting plate 3 removes less from the volume "a" than each of the two other and preceding cutting plates 1, 2.

In this manner, the radial spacings of the individual cutting plates, relative to one another, can consequently be adapted with respect to the longitudinal axis of the tool, such as to assure a particularly soft cut. In this way, there is achieved a particularly good guiding of the tool in the bore region of the bore to be drilled. An optimum surface quality of the bore to be processed can be achieved also in this manner.

Moreover, a particularly good equalization of the forces acting on the tool during drilling is made possible with this soft cut.

A circular cutting plate 3 is clamped with a suitable bracing claw 9 at a tool head 10, as can be seen in FIG. 3. In this manner, the cutting plate 3 is pressed by the bracing claw 9 against a shoulder 4 of the cutting head as marked in FIG. 1. The dash-dotted line of FIG. 3 indicates that the bracing claw 9 is provided with a circular-shaped recess. The inner diameter of the recess is adapted to the outer measurement of the cutting plate 3. The bracing claw 9 in part extends beyond the contours of the cutting plate 3. This covered part of the cutting plate 3 is indicated by a dashed line in FIG. 3. The cutting plate 3 is pressed against the tool head 10 in this region. By pressure on the front side of the cutting plate 3, the cutting plate 3 and the support washer 21 are pressed with its back side against the cutting head 10 (compare FIG. 8). The bracing claw 9 is rotatable around a screw 11 serving as a retaining means and providing an axis of rotation for the cutting plate in the tool head. The radial adjustment of the cutting plate 3 occurs by means of a setscrew 12. The setscrew 12 is provided with an external thread, which is engaged with a thread provided in a bore 13 in the cutting head 10. The bore 13 passes through the cutting head in such a way that the inner end of the setscrew 12 or of an adjustment bolt, acting together with the setscrew, is engaged with the underside of the bracing claw 9. When the setscrew 12 is screwed in, then the bracing claw 9 is pressed toward the outside with the cutting plate 3, such that there results a larger outer radius of the boring tool. Preferably, only a single setscrew 12 is employed. The setscrew 12 presses in the front region from below against the bracing claw 9 and tilts the bracing claw 9 in a counter-clockwise direction for example. Thereby the bracing claw turns around a bearing disk inserted into the cutting head 10.

The bracing claw 9 rests only in the region of the support washer 21 immediately at the tool head 10. A clear slot 23 is seen between the bracing claw 9 and the tool head 10. This implies that the bracing claw 9 can be pivoted so far at the tool head 10 until the bracing claw 9 contacts the tool head 10.

The radius of the final-machined bore can be very precisely preselected and maintained due to the radial adjustability of the cutting plate. This holds true in the case in which merely the last or, respectively, innermost cutting plate 3, viewed in feed direction, is radially adjustable.

The cutting plates 1, 2, 3 can be mounted to allow a rotation of the cutting plate during tool service operations and can be disposed on the periphery of the cutting head at a spacing of 120 degrees.

The individual cutting edges 14 of the cutting plates 1, 2, 3, formed by sections of a circular arc, can have associated therewith chip-guiding steps 15 curved into the shape of a circular arc. The cutting plate with the largest spacing relative to the longitudinal axis of the tool can be adjustable in radial direction. The spacing of all three cutting plates can be adjustable with respect to the longitudinal axis of the tool. The cutting plates can be placed such that the spacing measured in axial direction from circular cutting plate to circular cutting plate can be equal to or less than half the diameter D of the circular cutting plate, and preferably equal to or less than half the radius r of the circular cutting plate.

For a particularly smooth and quiet running of the boring tool, it is important that a soft cut is assured, that is a soft transition is formed between the regions cut out of the bore walls by the individual cutting plates. In order to assure an adaptation to various materials, the two front cutting plates 1 and 2 can also be formed radially adjustable in that they are held by bracing claws, as they are illustrated in FIG. 3. It is essential that the cutting plates are adjusted or, respectively, disposed staggered with respect to one another in radial and axial direction of the tool such that the two front cutting plates engage with regions of their peripheral line with the bore wall, which regions are disposed, viewed in feed direction of the tool, ahead of the region in the peripheral line with the largest spacing with respect to the longitudinal axis. Thus, the forces, acting laterally on the boring tool, are reduced to a minimum and the deflection of the boring tool out of the desired position during the boring operation is correspondingly small. Moreover, an optimum centering of the tool is achieved in the bore to be machined.

In the arrangement of the cutting plates, in particular evident from FIG. 2, an envelope is formed by the cutting edge section of the cutting plates engaging with the bore wall, with said envelope being curved in a circular shape. The radius of this envelope is here three to ten times larger than the diameter of the individual cutting plates. The cutting plates are disposed in such a way that the envelope passes in the region of the first and second cutting plate 1 and 2 in such a way that tangents plotted to the envelope are sloped in feed direction of the cutting plate. In no region of these two cutting plates does the tangent to the envelope proceed horizontally. This is achieved by the disposition of the cutting plates, namely in that the spacing measured in axial direction from cutting plate to cutting plate is selected such that it is preferably equal to or less than D/2, and preferably equal to or less than r/2. In this case, D designates the diameter and r the radius of the cutting plates. In this way, the active cutting edge regions 7 and 7' of the cutting plates 1 and 2, projecting into a plane according to FIG. 2, intersect themselves in the front region of the cutting plates, i.e. ahead of the location point on the peripheral line of the cutting plate exhibiting the largest spacing in relation to the longitudinal axis of the tool. The cutting plates 1, 2, and 3 are disposed such that there results, viewed in radial direction, a maximum spacing of preferably 2 mm between the frontmost and the hindmost cutting plate, i.e. the region a removed from the bore wall amounts preferably to a maximum of 2 mm. In this case, neighboring cutting plates are preferably staggered, viewed in axial direction, only by a maximum of 0.5 mm. The diameter of the cutting plates is preferably 4 to 7 mm.

This axial and radial disposition of the cutting plates assures that the cutting forces are compensated. An adaptation to varying cutting depths can occur with the axial and radial disposition of the cutting plates, thus assuring a soft cut at any time. The disposition of the cutting plates according to the invention assures that each circular cutting plate is active in cutting only over a limited angle over its circumference, thereby limiting the force exerted on an individual circular cutting plate by the material to be cut. In this way, there results in each case a particularly high surface quality of the workpiece to be machined.

Figure 4:
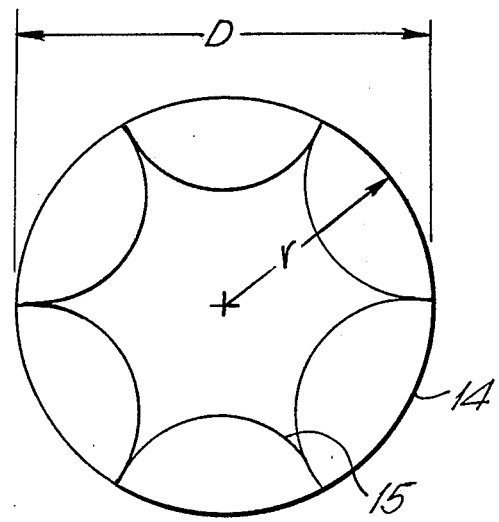
FIG. 4 is a top view onto a cutting plate, which is enlarged to better illustrate the chip-guiding steps.

FIG. 4 shows a top view onto the front side of a cutting plate 1. Such a cutting plate is described in more detail in copending U.S. application Ser. No. 07/093,369. Upon rotation of the tool, this front side points in the direction of the rotation motion. The outer edge of the cutting plate serves as cutting edge 14. The chips of the bore wall, running toward the inside from the outer edge or, respectively, the cutting edge, push against the chip-guiding steps 15, of semicircular shape in this case, and are thus broken. The chip-guiding steps are formed by a star-shaped elevation on the cutting plate. It is shown that the spacing from the cutting edge, engaged with the bore wall, with respect to the chip-guiding step can be varied in that the cutting plate is rotated. Thus, the spacing with respect to the chip-guiding step can be varied and can be adapted to different materials. It is therefore possible to adapt the chip breaking properties of the cutting plate to the material to be machined.

Figure 5:
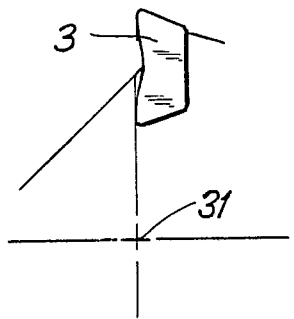
FIG. 5 is a sectional view of a cutting plate together with a reference cross.
Figure 7:
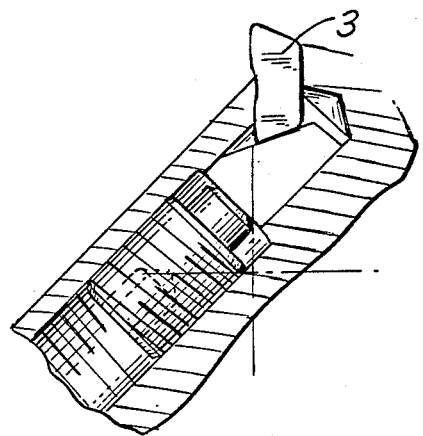
FIG. 7 is a sectional view of a position adjustment means for the cutting plate.
Figure 8:
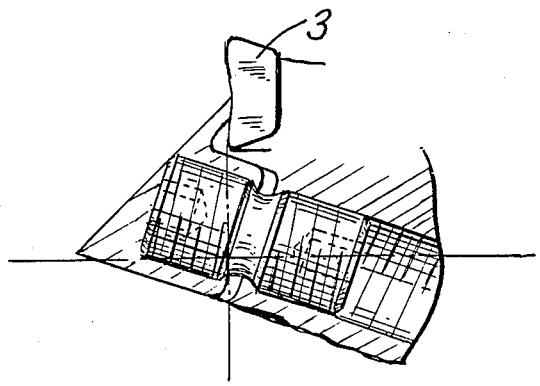
FIG. 8 is a sectional view of a cutting plate retaining means.

FIG. 5 shows a cross-section of the cutting plate 3 together with a reference cross 31. FIG. 7 illustrates the positioning of the cutting plate 3 with a screw adjustment system. FIG. 8 illustrates the retaining of the cutting plate 3 with a screw system. The reference cross allows a view of the comparative positioning of the cutting plate and of the respective screw system.

Figure 6:
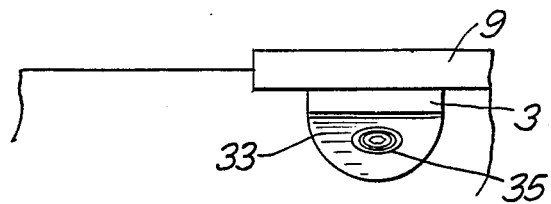
FIG. 6 is a side view of an attached cutting plate.

FIG. 6 shows a side view of an attachment of the cutting plate 3 with a bracing claw 9 and tensioning screw 35 for the tensioning plate 33.

This boring tool is suitable for the coarse and fine machining of the inner surfaces of bores, in particular for the machining of the inner surface of cylindrical bores in cast-steel workpieces.

It will be understood that each of the elements described above, or two or more together, may also find a useful application in other types of boring tools differing from the types described above.

While the invention has been illustrated and described as embodied in the context of a boring tool for coarse and fine machining, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A boring tool for simultaneous coarse and fine precision drilling of bores comprising
    a cutting head having a longitudinal rotation axis and a peripheral surface and having a plurality of shoulders;
    a fastening device coordinated to each shoulder;
    a plurality of cutting plates with substantially the entire outer edge of each individual cutting plate capable of serving as cutting edge by repositioning during respective servicing operations, wherein the cutting plates are arranged on the periphery of the cutting head, each fastening device pressing the respective cutting plate against a respective one of the shoulders of the cutting head, wherein the distances of the individual cutting plates from the longitudinal rotation axis of the cutting head are of different size, and where the cutting plates are disposed staggered with respect to one another in the direction of the longitudinal rotation axis, wherein the cutting plates are disposed such that a frontmost cutting plate and an immediately following cutting plate, viewed in feed direction, engage with a region of their cutting edge with the bore wall, where said region, viewed in feed direction, is located ahead of the location of a cutting edge section of a respective cutting plate having the largest distance from the longitudinal axis of the tool, wherein the cutting edge regions of respective cutting plates, and engaging with the bore wall, are selected such that they overlap one another and form substantially a circularly arched envelope upon a projection in a plane passing through the longitudinal axis of the cutting head, wherein each of the cutting plate projections and the circular envelope have a common point, at which common point the tangent of the respective cutting plate and of the circular envelope coincide and where the radius of said envelope can be approximated with a curvature having a radius of curvature of from about three to ten times the size of the diameter of the cutting plates.

2. The boring tool according to claim 1, wherein the cutting plates are mounted on the cutting head to allow a rotation of the cutting plate during tool service operations.

3. The boring tool according to claim 1, wherein the cutting plates are disposed on the periphery of the cutting head at an angular spacing of 120 degrees.

4. Boring tool according to claim 1, wherein the individual cutting edges of the cutting plates are formed by sections of a circular arc and have associated chip-guiding steps curved into the shape of a circular arc.

5. The boring tool according to claim 1, wherein the cutting plate with the largest spacing relative to the longitudinal axis of the tool is adjustable in radial direction.

6. The boring tool according to claim 1, wherein the spacing of all three cutting plates is adjustable with respect to the longitudinal axis of the tool.

7. The boring tool according to claim 1, wherein the cutting plates are placed such that the spacing measured in axial direction from circular cutting plate to circular cutting plate is equal to or less than half the radius (r) of the circular cutting plate.

8. The boring tool according to claim 1, wherein the cutting plates are placed such that the spacing measured in axial direction from circular cutting plate to circular cutting plate is equal to or less than half the diameter (D) of the circular cutting plate.

9. A cutting tool according to claim 1 wherein the fastening device includes a bracing claw formed of a circular sector having a chord with a sector diameter of from about 2 to 3 times the diameter of the cutting plate.

10. The boring tool according to claim 9 wherein the bracing claws have a recess in the area of a chord area of the circular sector within one side half of the chord of the bracing claw.

11. The boring tool according to claim 9 wherein the fastening device includes a bolt associated with a clamping disk integral with the bracing claw with the clamping disk serving as a pivot for the bracing claw, where the clamping disk has a diameter of from 1 to 1.5 times the diameter of the cutting plate, and wherein the clamping disk engages the circular sector of the bracing claw in the area of one half of its rounded edge, which half is disposed remote relative to the side of the chord provided with the recess for the cutting plate.

12. The boring tool according to claim 9 wherein the chord of the circular sector is directed substantially in parallel to the longitudinal rotation axis of the cutting head.

13. The boring tool according to claim 9 wherein the fastening device includes a bolt associated with a clamping disk for retaining the bracing claw, wherein the clamping disk is integral with the bracing claw with the clamping disk serving as a pivot for the bracing claw, where the bolt is threaded in a direction running about parallel to a rotation axis of the respective cutting plate.

14. The boring tool according to claim 9 wherein the cutting plate protrudes from a recess of the clamping jaw by a depth corresponding to 0.2 to 0.4 of the diameter of the cutting plate.

15. The boring tool according to claim 9 wherein the cutting plate protrudes from a recess of the clamping jaw by a depth corresponding to 0.25 to 0.35 of the diameter of the cutting plate.

16. The boring tool according to claim 1 wherein the fastening device includes a set screw for positioning the fastening device relative to the cutting head, wherein the advance direction of the set screw is disposed in a plane perpendicular to the longitudinal rotation axis of the cutting head.

17. A boring tool for simultaneous coarse and fine precision drilling of bores with a cutting head exhibiting a longitudinal axis and a peripheral surface with several cutting plates arranged on the periphery of the tool, each cutting plate pressed against a shoulder of the cutting head by means of a fastening device, where the distance of the cutting plates from the longitudinal axis of the cutting head is different, and where the cutting plates are staggered with respect to one another in the direction of the longitudinal axis, wherein the entire outer edge of one cutting plate can serve as cutting edge by repositioning during respective servicing operations, wherein the cutting plates are disposed such that the front cutting plates, viewed in feed direction, engage with a region of their cutting edge with the bore wall, where said region, viewed in feed direction, is located ahead of the location of the cutting edge having the largest distance from the longitudinal axis of the tool, wherein the cutting edge regions, engaging with the bore wall, are selected such that, upon a projection in an axial plane, they overlap one another and form a circularly arched envelope, where the radius of said envelope is three to ten times as large as the diameter of the cutting plates.

18. The boring tool according to claim 17, wherein the cutting plates (1, 2, 3) are mounted to allow a rotation of the cutting plate during tool service operations; wherein the cutting plates are disposed on the periphery of the cutting head at a spacing of 120 degrees.

19. The boring tool according to claim 17, wherein the individual cutting edges (14) of the cutting plates (1, 2, 3), formed by sections of a circular arc, have associated therewith chip-guiding steps (15) curved into the shape of a circular arc.

20. The boring tool according to claim 17, wherein the cutting plate with the largest spacing relative to the longitudinal axis of the tool is adjustable in radial direction.

21. The boring tool according to claim 17, wherein the spacing of all three cutting plates is adjustable with respect to the longitudinal axis of the tool.

22. The boring tool according to claim 17, wherein the cutting plates are placed such that the spacing measured in axial direction from circular cutting plate to circular cutting plate is equal to or less than half the diameter (D) of the circular cutting plate.

23. The boring tool according to claim 17, wherein the cutting plates are placed such that the spacing measured in axial direction from circular cutting plate to circular cutting plate is equal to or less than half the radius (r) of the circular cutting plate.

* * * * *